United States Patent
Jones et al.

(10) Patent No.: US 9,239,781 B2
(45) Date of Patent: Jan. 19, 2016

(54) STORAGE CONTROL SYSTEM WITH ERASE BLOCK MECHANISM AND METHOD OF OPERATION THEREOF

(71) Applicant: SMART Storage Systems, Inc., Chandler, AZ (US)

(72) Inventors: Ryan Jones, Mesa, AZ (US); Robert W. Ellis, Phoenix, AZ (US)

(73) Assignee: SMART STORAGE SYSTEMS, INC., Milpitas, CA (US)

( * ) Notice: Subject to any disclaimer, the term of this patent is extended or adjusted under 35 U.S.C. 154(b) by 283 days.

(21) Appl. No.: 13/648,869

(22) Filed: Oct. 10, 2012

(65) Prior Publication Data

US 2013/0205102 A1 Aug. 8, 2013

Related U.S. Application Data

(60) Provisional application No. 61/596,185, filed on Feb. 7, 2012.

(51) Int. Cl.
*G06F 12/00* (2006.01)
*G06F 12/02* (2006.01)
*G06F 12/06* (2006.01)
*G06F 13/16* (2006.01)

(52) U.S. Cl.
CPC ............ *G06F 12/0246* (2013.01); *G06F 12/06* (2013.01); *G06F 13/1684* (2013.01)

(58) Field of Classification Search
CPC .............................. G06F 12/0246; G06F 12/06
USPC ........................................................ 711/154
See application file for complete search history.

(56) References Cited

U.S. PATENT DOCUMENTS

| | | | |
|---|---|---|---|
| 4,048,481 A | 9/1977 | Bailey, Jr. et al. | |
| 4,839,587 A | 6/1989 | Flatley et al. | |
| 5,034,744 A | 7/1991 | Obinata | |
| 5,210,854 A | 5/1993 | Beaverton et al. | |
| 5,311,395 A | 5/1994 | McGaha et al. | |
| 5,450,354 A | 9/1995 | Sawada et al. | |
| 5,479,638 A | 12/1995 | Assar et al. | |
| 5,784,174 A | 7/1998 | Fujino et al. | |
| 5,790,828 A | 8/1998 | Jost | |
| 5,930,504 A | 7/1999 | Gabel | |

(Continued)

FOREIGN PATENT DOCUMENTS

| | | |
|---|---|---|
| EP | 1 956 489 A2 | 8/2008 |
| EP | 1 990 921 A2 | 11/2008 |

(Continued)

OTHER PUBLICATIONS

International Search Report and Written Opinion dated Jun. 12, 2014, received in PCT/US2014/018972, which corresponds to U.S. Appl. No. 13/779,352, 12 pages (Schmier).

(Continued)

*Primary Examiner* — Prasith Thammavong
(74) *Attorney, Agent, or Firm* — Morgan, Lewis & Bockius LLP

(57) ABSTRACT

A method of operation of a storage control system includes: partitioning memory channels with memory devices; selecting a super device with one of the memory devices from one of the memory channels, the super device having a super chip select connected to chip selects of the memory devices; and selecting a super block associated with the super device.

20 Claims, 8 Drawing Sheets

(56) References Cited

U.S. PATENT DOCUMENTS

| | | |
|---|---|---|
| 5,949,785 A | 9/1999 | Beasley |
| 5,963,983 A | 10/1999 | Sakakura et al. |
| 6,034,897 A * | 3/2000 | Estakhri et al. .......... 365/185.33 |
| 6,069,827 A | 5/2000 | Sinclair |
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,176 B1 | 4/2002 | Kim et al. |
| 6,381,670 B1 | 4/2002 | Lee et al. |
| 6,412,080 B1 | 6/2002 | Fleming et al. |
| 6,529,997 B1 * | 3/2003 | Debiez ................. G06F 3/0614 711/114 |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,853,749 B2 | 12/2010 | Kolokowsky |
| 7,979,614 B1 | 7/2011 | Yang |
| 8,000,161 B2 | 8/2011 | Stan et al. |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,397,101 B2 | 3/2013 | Goss et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,521,981 B2 | 8/2013 | Strauss et al. |
| 8,560,770 B2 | 10/2013 | Haines et al. |
| 8,601,203 B2 | 12/2013 | Holbrook et al. |
| 8,612,669 B1 | 12/2013 | Syu et al. |
| 8,612,804 B1 * | 12/2013 | Kang ................. G11C 16/349 714/42 |
| 8,661,184 B2 | 2/2014 | Wood et al. |
| 8,694,811 B2 | 4/2014 | Raju et al. |
| 8,750,052 B2 | 6/2014 | Aoki et al. |
| 8,793,556 B1 | 7/2014 | Northcott et al. |
| 8,799,747 B2 | 8/2014 | Goss et al. |
| 8,832,506 B2 | 9/2014 | Griffin et al. |
| 8,862,818 B1 * | 10/2014 | Ozdemir ............. G06F 11/1076 711/114 |
| 8,880,838 B2 | 11/2014 | Kaiser et al. |
| 8,984,216 B2 | 3/2015 | Fillingim |
| 9,043,668 B2 | 5/2015 | Goss et al. |
| 9,063,844 B2 | 6/2015 | Higgins et al. |
| 9,069,468 B2 | 6/2015 | Mehra et al. |
| 9,116,401 B2 | 8/2015 | Kim et al. |
| 2002/0056025 A1 | 5/2002 | Qiu et al. |
| 2002/0156891 A1 | 10/2002 | Ulrich et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 * | 6/2005 | Gonzalez et al. ................. 714/8 |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0080505 A1 | 4/2006 | Arai et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0079152 A1 | 4/2007 | Winick et al. |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0028246 A1 | 1/2008 | Witham |
| 2008/0046630 A1 | 2/2008 | Lasser |
| 2008/0052446 A1 * | 2/2008 | Lasser et al. ................. 711/103 |
| 2008/0082736 A1 | 4/2008 | Chow et al. |
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0263289 A1 | 10/2008 | Hosoya et al. |
| 2008/0313505 A1 * | 12/2008 | Lee et al. ........................ 714/47 |
| 2009/0006900 A1 | 1/2009 | Lastras-Montano et al. |

(56) References Cited

U.S. PATENT DOCUMENTS

| | | |
|---|---|---|
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0172248 A1 | 7/2009 | You |
| 2009/0172262 A1 | 7/2009 | Olbrich et al. |
| 2009/0179707 A1 | 7/2009 | Higashino |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1* | 10/2009 | Sinclair .................. 711/103 |
| 2009/0287975 A1 | 11/2009 | Kim et al. |
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0082890 A1 | 4/2010 | Heo et al. |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |
| 2010/0169541 A1 | 7/2010 | Freikorn |
| 2010/0172179 A1* | 7/2010 | Gorobets et al. ......... 365/185.09 |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0099342 A1 | 4/2011 | Ozdemir |
| 2011/0107144 A1 | 5/2011 | Ohara |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1* | 9/2011 | Post .................. 714/763 |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0023144 A1* | 1/2012 | Rub .................. G06F 12/0246 707/813 |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0079348 A1 | 3/2012 | Naeimi |
| 2012/0079355 A1 | 3/2012 | Patapoutian et al. |
| 2012/0096217 A1 | 4/2012 | Son et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0061019 A1 | 3/2013 | Fitzpatrick et al. |
| 2013/0073788 A1 | 3/2013 | Post et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0104005 A1 | 4/2013 | Weingarten et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0205102 A1 | 8/2013 | Jones et al. |
| 2013/0232290 A1 | 9/2013 | Ish et al. |
| 2013/0238833 A1 | 9/2013 | Vogan et al. |
| 2013/0265825 A1 | 10/2013 | Lassa |
| 2013/0332791 A1 | 12/2013 | Chu |
| 2014/0036589 A1 | 2/2014 | Parthasarathy et al. |
| 2014/0059359 A1 | 2/2014 | Bahirat |
| 2014/0108891 A1 | 4/2014 | Strasser et al. |
| 2014/0129874 A1 | 5/2014 | Zaltsman et al. |
| 2014/0158525 A1 | 6/2014 | Greene |
| 2014/0181370 A1 | 6/2014 | Cohen et al. |
| 2014/0208174 A1 | 7/2014 | Ellis et al. |
| 2014/0372777 A1 | 12/2014 | Reller et al. |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 A1 | 4/2009 |
| WO | WO 2011/156466 A2 | 12/2011 |

OTHER PUBLICATIONS

International Search Report and Written Opinion dated May 14, 2014, received in International Patent Application No. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

Ulinktech, "ATA Command Table (in Alphabetic Order)," Feb. 6, 2011, https://web.archive.org/web/20110206060820/http://www.ulinktech.com/downloads/AT, 6 pages.

International Search Report and Written Opinion dated Aug. 22, 2014, received in International Patent Application No. PCT/US2014/

(56) References Cited

OTHER PUBLICATIONS 032978, which corresponds to U.S. Appl. No. 14/081,992, 10 pages (Ellis).
International Search Report dated Mar. 25, 2014, received in International Patent Application No. PCT/US2013/072400, which corresponds to U.S. Appl. No. 13/690,337, 3 pages (Ellis).
Invitation to Pay Additional Fees dated Jul. 25, 2014, received in International Patent Application No. PCT/US2014/021290, which corresponds to U.S. Appl. No. 13/791,797, 8 pages (Dean).
International Search Report and Written Opinion dated Jul. 31, 2014, received in International Patent Application No. PCT/US2014/031465, which corresponds to U.S. Appl. No. 13/851,928, 13 pages (Ellis).
International Search Report and Written Opinion dated Jul. 31, 2014, received in International Patent Application No. PCT/US2014/033876, which corresponds to U.S. Appl. No. 13/861,326, 9 pages (Fitzpatrick).
Cooke, "Introduction to Flash Memory (T1A)," Flash Memory Summit, Aug. 22, 2008, Micron Technology, Inc., 102 pages.
Gal et al., "Algorithms and Data Structures for Flash Memories," ACM Computing Surveys, Jun. 2005, vol. 37, No. 2, 30 pages.
IBM Corporation, "Systems Management, Work Management," Version 5, Release 4, 9th Edition, Feb. 2006, pp. 1-21.
O'Brien, "SMART Storage Systems Optimus SAS Enterprise SSD Review," SMART Storage Systems, Oct. 9, 2012, 44 pages.
Spanjer, "Flash Management—Why and How?" Smart Modular Technologies, Nov. 2009, http://www.scantec.de/fileadmin/pdf/Smart_Modular/Flash-Management.pdf, 14 pages.
Texas Instruments, "Power Management IC for Digital Set Top Boxes," SLVSA10A, Sep. 2009, pp. 1-22.
International Search Report and written Opinion dated Dec. 20, 2013, received in PCT/US2013/045282, which corresponds to U.S. Appl. No. 13/493,949, 7 pages (Ellis).
International Search Report and Written Opinion dated Nov. 7, 2014, received in International Patent Application No. PCT/US2014/049732, which corresponds to U.S. Appl. No. 14/334,350, 13 pages (Fitzpatrick).
International Search Report and Written Opinion dated Oct. 17, 2014, received in International Patent Appilcation No. PCT/US2014/049734, which corresponds to U.S. Appl. No. 14/332,259, 8 pages (Higgins).
International Search Report and Written Opinion dated Oct. 23, 2014, received in International Patent Application No. PCT/US2014/049736, which corresponds to U.S. Appl. No. 14/446,249 8 pages (Fitzpatrick).
International Search Report and Written Opinion dated Nov. 5, 2014, received in International Patent Application No. PCT/US2014/049282, which corresponds to U.S. Appl. No. 13/957,407, 12 pages (Fitzpatrick).
Narayanan et al., "Migrating Server Storage to SSDs: Analysis of Tradeoffs," Computer Systems, Apr. 2009, 12 pages.
Shiraz et al., "Block Aging Prevention Technique (BAP) for Flash Based Solid State Disks," 7th International Conference on Emerging Technologies (ICET), Sep. 5, 2011, 6 pages.
Tai et al, "Prolongation of Lifetime and the Evaluation Method of Dependable SSD," 25 International Symposium on Defect and Fault Tolerance in VLSI Systems, 2010, NJ, USA, 8 pages.
Tseng et al., "Understanding the Impact of Power Loss on Flash Memory," DAC'11, Jun. 5-10, 2011, San Diego, California, 6 pages.
Yimo et al., "WeLe-RAID: A SSD-Based RAID for System Endurance and Performance," Jan. 2011, Network and Parallel Computing, Springer, 14 pages.
International Search Report and Written Opinion dated Jan. 9, 2015, received in International Patent Application No. PCT/US2014/049731, which corresponds to U.S. Appl. No. 14/334,324, 9 pages (Fitzpatrick).
International Search Report and Written Opinion dated Feb. 18, 2015, received in International Patent Application No. PCT/US2014/065401, which corresponds to U.S. Appl. No. 14/082,031, 9 pages (Higgins).
International Search Report dated Apr. 15, 2014, received in International Patent Application No. PCT/US2013/078340, which corresponds to U.S. Appl. No. 13/746,542, 11 pages (Ellis).

\* cited by examiner

US 9,239,781 B2

STORAGE CONTROL SYSTEM WITH ERASE BLOCK MECHANISM AND METHOD OF OPERATION THEREOF

CROSS-REFERENCE TO RELATED APPLICATION

This application claims the benefit of U.S. Provisional Patent Application Ser. No. 61/596,185 filed Feb. 7, 2012, and the subject matter thereof is incorporated herein by reference thereto.

TECHNICAL FIELD

The present invention relates generally to a storage control system and more particularly to a system for data management and control.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. NOT-AND (NAND) flash is one form of non-volatile memory used in solid-state storage devices. The memory cells are arranged in typical row and column fashion with circuitry for accessing individual cells and placing the memory transistors of those cells store an analog value that can be interpreted to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is that it tends to have a limited life in use.

Thus, a need still remains for better data management devices. In view of the increasing demand for data management devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: partitioning memory channels with memory devices; selecting a super device with one of the memory devices from one of the memory channels, the super device having a super chip select connected to chip selects of the memory devices; and selecting a super block associated with the super device.

The present invention provides a storage control system, including: a channel control module for partitioning memory channels with memory devices; a device control module for selecting a super device with one of the memory devices from one of the memory channels, the super device having a super chip select connected to chip selects of the memory devices; and a block control module for selecting a super block associated with the super device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
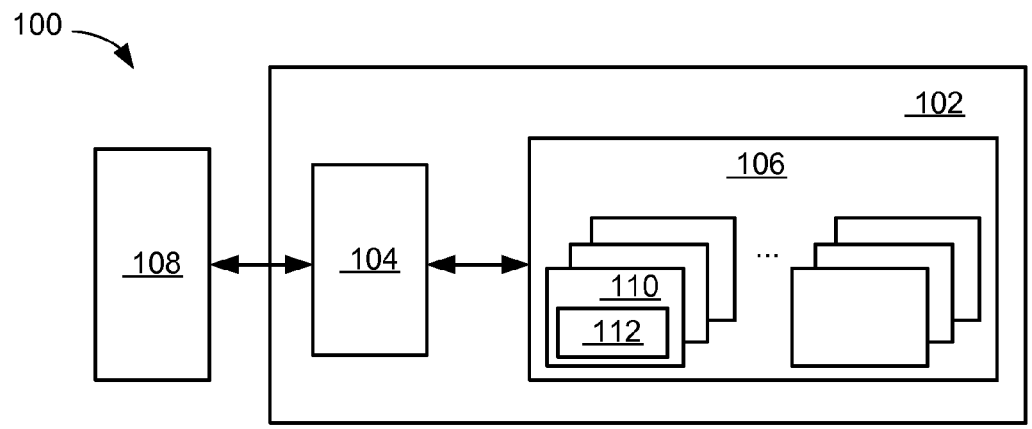
FIG. 1 is a storage control system with data management mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown a storage control system 100 with data management mechanism in an embodiment of the present invention. The storage control system 100 includes a memory sub-system 102 having a memory controller 104 and a memory array 106. The storage control system 100 includes a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 includes an array of memory devices 110 including flash memory devices or non-volatile memory devices. The memory array 106 can include pages of data or information. The host system 108 can request the memory controller 104 for reading, writing, and deleting data from or to a logical address space of a storage device or the memory sub-system 102 that includes the memory array 106.

The memory devices 110 can include chip selects 112, which are defined as control inputs, for enabling the memory devices 110. Each of the chip selects 112 can be used to control the operation of one of the memory devices 110. Each of the chip selects 112 can be used to control sub addresses or logical units (LUNs) within each of the memory devices 110. When the chip selects 112 are enabled, the memory devices 110 are in active state for operation including reading, writing, or erasing.

Figure 2:
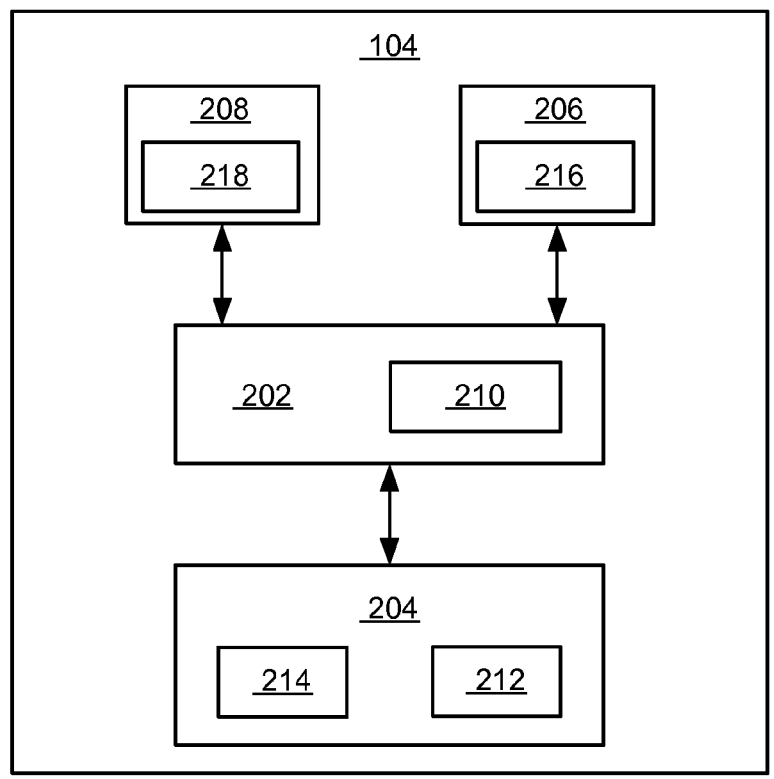
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with a dedicated hardware including an application-specific integrated circuit (ASIC), a configurable hardware including a field-programmable gate array (FPGA), a discrete electronic hardware, or a combination thereof.

The storage unit 204 can include both hardware and the software 212. For example, the software 212 can include control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
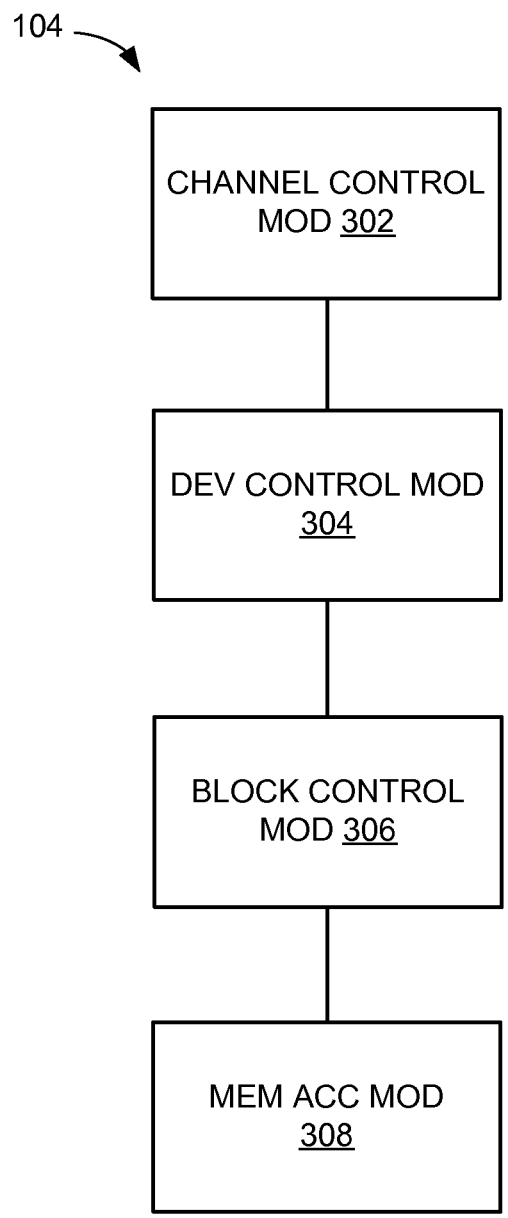
FIG. 3 is a control flow of the memory controller.

Referring now to FIG. 3, therein is shown a control flow of the memory controller 104. The memory controller 104 can include a channel control module 302, a device control module 304, a block control module 306, and a memory access module 308.

Figure 4:
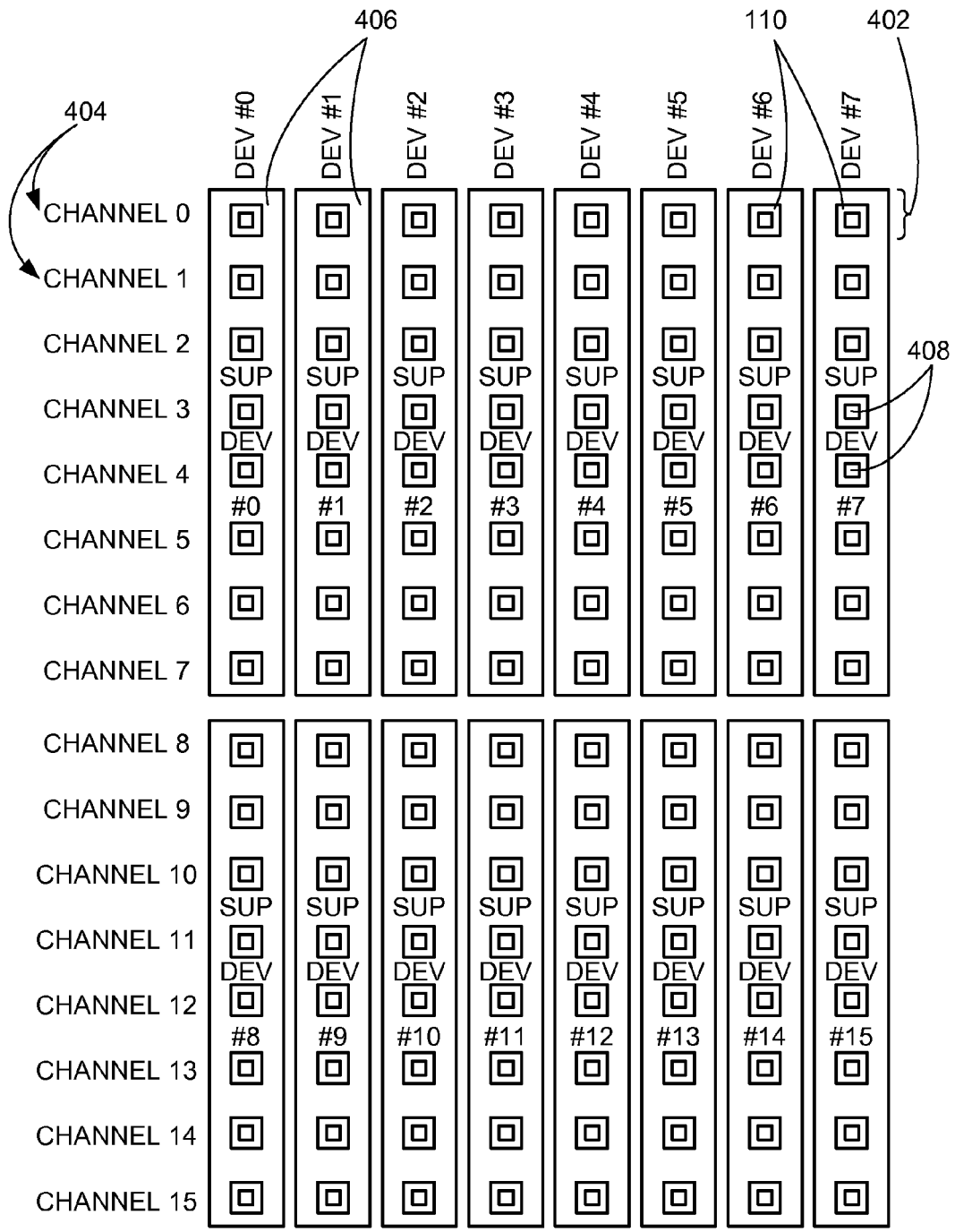
FIG. 4 is an example diagram of memory groups of the memory devices.

The channel control module 302 is for performing operations associated with memory channels 404 of FIG. 4. The device control module 304 is for performing operations associated with super devices 406 of FIG. 4. The block control module 306 is for performing operations associated with super blocks 502 of FIG. 5. The memory access module 308 is for performing operations to access data in the memory devices 110 of FIG. 1 based on the super blocks 502. Operations of the channel control module 302, the device control module 304, the block control module 306, and the memory access module 308 will be described in more details in subsequent sections.

Referring now to FIG. 4, therein is shown an example diagram of memory groups 402 of the memory devices 110. The memory groups 402 are defined as logical association or grouping of physical instances of the memory devices 110. The term "logical" refers to non-physical and thus does not represent the physical configuration of the memory devices 110.

The memory groups 402 can be identified by the channel control module 302 of FIG. 3. Each of the memory groups 402 can be identified as being associated with a number of the memory devices 110. Although each of the memory groups 402 is shown associated with eight of the memory devices 110 for illustration purposes, it is understood that each of the memory groups 402 can be associated with any number of the memory devices 110.

Each of the squares in FIG. 4 is one of the memory devices 110, which can represent independently controllable memory devices. For example, for NAND flash memories, the memory devices 110 can represent dies or logical unit numbers (LUNs). An important point is that the memory devices 110 can execute commands independently from each other allowing parallel operations. This independent operation is used to gain greater bandwidths and high I/O operations (IOPS).

The channel control module 302 can partition each of the memory channels 404 that are associated with a number of the memory devices 110. Each of the memory channels 404 is defined as a physical bank or a physical group of the memory devices 110 that share a common data bus and a common set of associated control signals.

The memory channels 404 can represent an independent bus or communication path. Each of the memory channels 404 can represent an independent execution unit. Each of the memory channels 404 can include an ability to perform independent and parallel operations with respect to other instances of the memory channels 404.

Actions, commands, and status information transmitted within one of the memory channels 404 can be limited to the memory devices 110 that are connected to the one of the memory channels 404 and can be independent from other instances of the memory channels 404 within a storage device. Data bus and control signals of one of the memory channels 404 cannot be shared with the other instances of the memory channels 404.

Each of the memory channels 404 can include a number of bits of data based on a type of the memory devices 110. For example, each of the memory channels 404 can include 8 bits, 16 bits, or any number of bits of data bus depending on the type of the memory devices 110 used and the construction of the memory controller 104. Also for example, the memory channels 404 can represent physical channels.

For example, one of the memory channels 404 can control or have ownership of a set of the memory devices 110 that share a common data bus and control signals. Also for example, the memory devices 110 can represent flash devices or flash components that independently operate from each other.

The device control module 304 of FIG. 3 can identify or select the super devices 406, which are defined as groups of the memory devices 110. The super devices 406 can include portions of the memory channels 404. The super devices 406 can be selected with one of the memory devices 110 from one of the memory channels 404. The term "super" in the super devices 406 refers to a group of multiple hardware instances of the memory devices 110.

The device control module 304 can group the memory devices 110 from the memory channels 404 to form the super devices 406. For example, if there are 16 of the memory channels 404 and 8 of the memory devices 110 per each of the memory channels 404, there can be 8 of the memory devices 110, one from each of the memory channels 404, grouped together for each of the super devices 406 and 16 of the super devices 406 as shown in FIG. 4. The super devices 406 can include a number of the memory devices 110 that are controlled in parallel across a number of the memory channels 404. The super devices 406 can be constructed with or associated with any number of the memory channels 404 that are executed in parallel.

Each of the super devices 406 can be associated with one of the memory devices 110 from each of the memory channels 404. Although each of the super devices 406 is shown having 8 of the memory devices 110 for illustration purposes, it is understood that each of the super devices 406 can include any number of the memory devices 110. For example, each of the super devices 406 can include up to a number of the memory channels 404. Also for example, all of the super devices 406 can have the same structure and size. Each of the super devices 406 can include any number of the memory devices 110 per each of the memory channels 404. In this case, there can be multiple passes made or accessed through the memory channels 404. For example, each of the super devices 406 can include a number of the memory channels 404 with 2 of the memory devices 110 per each of the memory channels 404.

Each of the super devices 406 can include one of the memory devices 110 from each of the memory channels 404. Each of the super devices 406 can include a number of the super blocks 502 of FIG. 5, each of which can include a number of erase blocks 408 (EB). The super blocks 502 are defined as logical groupings of the erase blocks 408 in the memory devices 110. Although there are 16 of the super devices 406 shown for illustration purposes, there can be any number of the super devices 406 identified by the device control module 304. The number of the super devices 406 can be based on a number of independently accessible instances of the memory devices 110 on the memory channels 404 selected by Chip Enables (CEs), logically addressable units (LUNs), or a combination thereof.

The erase blocks 408 are units of a non-volatile memory device or other types of block oriented non-volatile memory devices. For example, the erase blocks 408 can be one of atomic units of a NAND flash memory device or other types of block oriented non-volatile memory devices, which no finer control over erasing memory elements is capable. Also for example, the erase blocks 408 can form a part of a logically addressable memory space within a NAND flash or other type of block oriented non-volatile memory devices.

The erase blocks 408 can represent the smallest unit of memory that can be erased. The memory devices 110 can represent NAND packages that can include multiple dies or logically addressable units (LUNs). Each of the dies or LUNs can include multiple planes, each of which can include a number of the erase blocks 408. Each of the erase blocks 408 can include a number of pages, which can include a number of bytes.

For example, each of the planes can include approximately 2048 of the erase blocks 408. Also for example, each of the erase blocks 408 can include 256 pages, each of which can include 8K bytes, where each 1K bytes includes 1024 bytes. A die can include approximately 4096 of the erase blocks 408 divided into two of the planes with 2048 of the erase blocks 408 per plane.

As an example, each of the super devices 406 can access one of the super blocks 502 at any given instance. Each of the super blocks 502 can include a number of the erase blocks 408 that are accessible by one of the super devices 406 at any given time. There can be one of the erase blocks 408 active for each of the memory channels 404 within one of the super devices 406. The erase blocks 408 can be assigned across the memory channels 404 so that they can be accessed in a parallel approach. One of the erase blocks 408 can be assigned per each of the memory channels 404 to form one of the super blocks 502 in the super devices 406.

In an example of one of the super devices 406 having 8 of the memory devices 110, there can be 8 active instances of the erase blocks 408 associated with the one of the super devices 406. The 8 active instances of the erase blocks 408 can belong to a specific instance of the super blocks 502. Also as an example, there can be multiple active instances of the erase blocks 408 per each of the memory devices 110.

The present invention can include architecture and use of the memory devices 110 including NAND flash or other block oriented non-volatile memory organized in efficient groups to reduce the overhead of and runtime management in a solid state storage device. The present invention can include the super blocks 502 as an organization of memory blocks for parallel use by multiple memory controllers and the logical and physical linkage between the memory blocks. The present invention can provide additional organization for data protection via RAID operations with reduced overhead for both runtime recycling and drive initialization speed. The present invention can provide an additional structure for managing bad block memory elements without detriment or loss of system performance or efficiency.

The super blocks 502 provide the following effects. One of the effects is amount of metadata that is stored in each of the erase blocks 408 is minimized or reduced. Such metadata can now be stored at a super-block level or in one of the super blocks 502. Another of the effects is fewer blocks are managed as well as reduction in time to initialize these data structures.

Another of the effects is host data is written to the super blocks 502 in a deterministic order. Another of the effects is recycling can traverse or access the super blocks 502 in the same order by which the host system 108 writes data. As a result, recycling operations can preserve the same order used in write operations providing data striping for optimal readback performance.

It has been discovered that the super devices 406 provide improved performance by grouping of the memory devices 110 that are controlled in parallel across a number of the memory channels 404.

Figure 5:
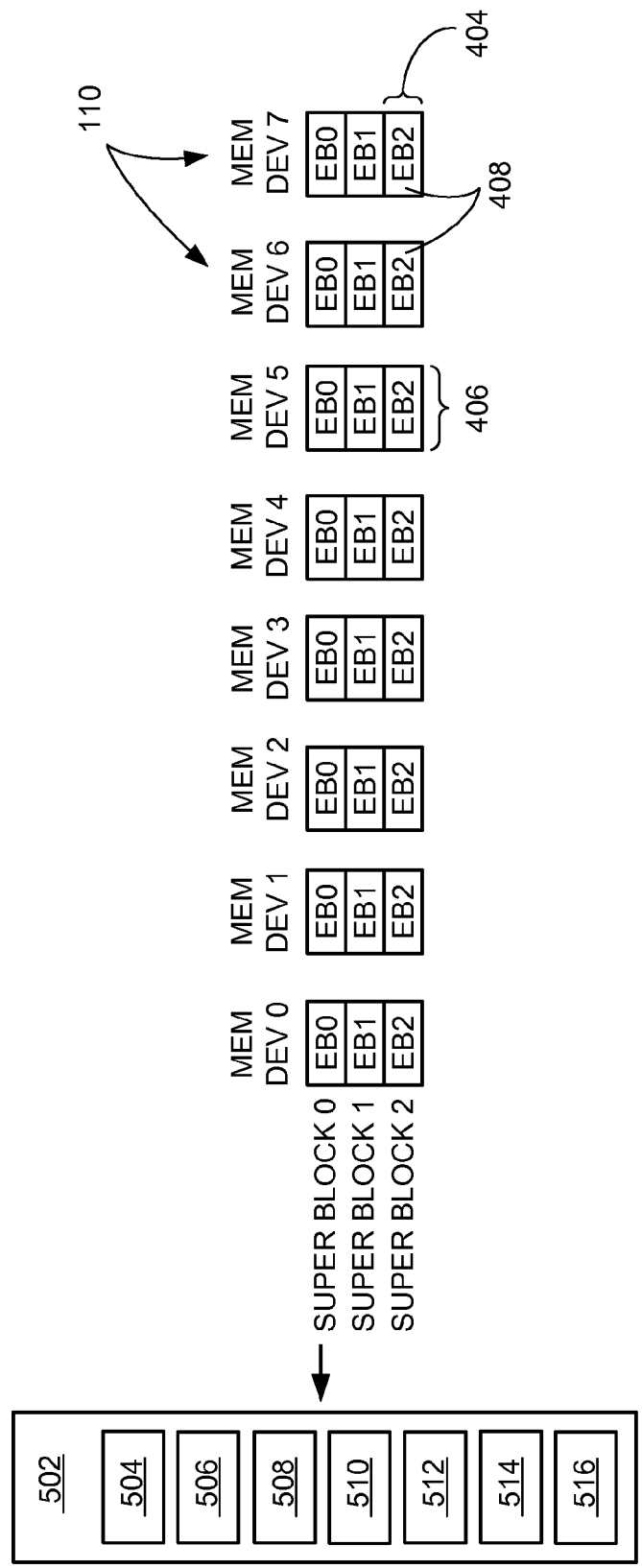
FIG. 5 is an example diagram of the super blocks.

Referring now to FIG. 5, therein is shown an example diagram of the super blocks 502. The super blocks 502 are defined as groups of the erase blocks 408. The groups of the erase blocks 408 can be operated as one virtual erase block, which can be included within one of the super devices 406. The super blocks 502 allow the management of a group of individual physical instances of the erase blocks 408 as though it was one larger erase block. Actions including host writes, recycling operations, or erasing of blocks can be performed on a set of the erase blocks 408 included within one of the super blocks 502 as a single unit.

Each of the super blocks 502 can be identified and selected by the block control module 306 of FIG. 3. Each of the super blocks 502 is defined as a group of the erase blocks 408 that span across multiple of the memory channels 404 within one of the super devices 406. As an example, each of the memory devices 110 in the super blocks 502 can contribute a pair of the erase blocks 408 that can be accessed together. Each of the super blocks 502 can be selected to be associated with the super devices 406. Each of the super blocks 502 can be accessed via and associated with only one of the super devices 406. Since the super devices 406 span across multiple of the memory channels 404, the super blocks 502 can also span across multiple of the memory channels 404. The term "spanning across" used above for the super blocks 502 refers to portions of different instances of the memory channels 404 are included in each of the super blocks 502.

There can be a number of the super devices 406 included in a solid-state drive or a storage system dictated by a number of addressable elements within the memory channels 404 that can be controlled in a parallel method of operation. There can be a number of the super blocks 502 per each of the super devices 406. Any of the super blocks 502 can be associated with one and only one of the super devices 406.

All the chip selects 112 of FIG. 1 of the memory devices 110 can be partitioned into groups that can be controlled by super chip selects 504. The super chip selects 504 can be selected by the block control module 306. The super chip selects 504 can be selected by partitioning the chip selects 112. The super chip selects 504 are defined as groups of the chip selects 112 that are associated with the erase blocks 408 that form the corresponding instances of the super blocks 502.

One of the super chip selects 504 is selected to be associated with one of the super blocks 502 and a group of the chip selects 112 of the memory devices 110 that are associated with the one of the super blocks 502. The one of the super chip selects 504 can be used to control the group of the chip selects 112. The super chip selects 504 are associated with the super blocks 502. The super chip selects 504 are provided by the block control module 306 to control operation of the memory devices 110.

The super chip selects 504 can be used to assert or de-assert the chip selects 112. The chip selects 112 can be asserted or de-asserted to enable or disable, respectively, the memory devices 110. For example, the chip selects 112 can be asserted or de-asserted by the block control module 306 assigning the super chip selects 504 to an active or inactive state such that the chip selects 112 are driven to logic '1' or '0', respectively, to enable or disable the memory devices 110.

Each of the super blocks 502 can span or include only one of the super chip selects 504. By having multiple of the super chip selects 504 for multiple of the super blocks 502, one of the super chip selects 504 can be available for writing host data from the host system 108 of FIG. 1 to the memory array 106 of FIG. 1 and another of the super chip selects 504 can be provided for reading and writing recycling data to the memory array 106. The partition of the chip selects 112 and the provision of the super chip selects 504 eliminate conflict between host write and block erase operations because these operations are performed with difference instances of the super chip selects 504. Furthermore, conflict between host read and host write (or recycle) operations can also be eliminated by mutual exclusion between operations on the super chip selects 504.

If there are several pending host reads, there is a good chance that one of them can be located on one of the super chip selects 504 that are idle. If data requested for a host read operation was written by a large-block host write operation, there is a good chance that all the data can be read with one of the super chip selects 504 that was used for the large-block host write operation.

The last instance of the erase blocks 408 at the end of one of the super blocks 502 can be written by the block control module 306. The last instance of the erase blocks 408 can be written with parity information 506 for RAID-5 architectures. As such, the size of each of the super blocks 502 can determine the overhead in the RAID-5 architectures. The last instance of the erase blocks 408 is the last block to be accessed in the order by which the erase blocks 408 in the super blocks 502 are written by the host system 108. RAID-5 refers to an implementation for redundant array of independent disks (RAID) systems that uses block-level striping with parity data distributed across all member disks.

An allocation of the erase blocks 408 within one of the super blocks 502 can provide additional area for storage of the parity information 506 including RAID parity data. The parity information 506 can only be complete after a full stripe across all the erase blocks 408 within the super blocks 502 are written. The parity information 506 can be stored within one of the super blocks 502.

The parity information 506 is defined as redundancy data that is used to rebuild or reconstruct a memory array to recover lost or corrupt data. The parity information 506 can be calculated by the block control module 306 using exclusive-OR (XOR) binary operation performed on the data to be stored.

Other effects include, for RAID-5 operations, the last of the erase blocks 408 in the super blocks 502 can be reserved for parity bits by the block control module 306. As a result, parity pages are recycled along with data pages. Having the parity pages in a dedicated instance of the erase blocks 408, possibility of read disturb on these pages is significantly reduced.

The parity pages can be read only if there is an error correction code (ECC) error in one of the data pages in the super blocks 502. The parity pages can only be used in a case of an uncorrectable error and thus can have an extremely low read count, making them less susceptible to read disturb issues. Data retention in parity blocks can be better than that of data blocks in the super blocks 502 that are read a large number of times.

A read disturb in the memory devices 110 is a change of values of memory cells by an act of reading a memory cell or other memory cells within the memory devices 110. For example, in a NAND flash, read disturbs can be limited to cells within one of the erase blocks 408. An example of this is reading from one page of memory within one of the erase blocks 408 in the memory devices 110 can corrupt and change memory cells in other pages within the one of the erase blocks 408. The read disturb affect refers to the process of reading memory will create errors in the memory. Read disturbs are not always permanent and can be corrected when the memory is rewritten.

Each time a page is read in one of the erase blocks 408, a small amount of charge change is experienced by other pages within the one of the erase blocks 408. Therefore, by reading pages in one of the erase blocks 408, the bit error rate (BER) of the other pages can increase. By locating the RAID-5 parity data in the erase blocks 408 other than the erase blocks 408 being used for user data, the parity data does not suffer the same read disturbs as the normal data.

Read-write and read-erase conflicts can be minimized by the block control module 306. The conflicts can be minimized by partitioning the super blocks 502 using the super chip selects 504. By rebalancing the super blocks 502 with the memory access module 308 of FIG. 3 when recycling, a number of valid pages can be rebalanced between the chip selects 112.

There are positive factors of having the super blocks 502. The positive factors include fewer blocks to manage, fewer metadata pages 508, infrastructure support for a RAID-5 implementation, and minimization of writes to a logical-to-physical (L2P) log during recycling. The metadata pages 508 can be written by the block control module 306 to include logical page indexes. The metadata pages 508 can be grouped and written once per each of the super blocks 502 as opposed to keeping metadata in each of the erase blocks 408. This grouping of the metadata can also make traversing it during drive initialization more efficient.

The term "metadata" refers to non-host related information that is in addition to and stored along with host data and that aids or supports retrieval, organization, health of, and current condition or state of the memory devices 110. For example, metadata can include non-host related information including logical-to-physical mapping information of the host data within the memory devices 110. Also for example, metadata can include non-host related information including logical block address (LBA) information, super block identification (ID) values, program/erase (PE) cycles, aging data, and other NAND statistics that is collected as a consequence of normal operations.

As an example, there can be transient metadata held or stored in the storage unit 204 with a Random access memory (RAM), a Static random-access memory (SRAM), and a double data rate-synchronous dynamic random access memory (DDRAM). As another example, there can be persistent metadata held or stored in the memory devices 110.

The memory devices 110 that form the super devices 406 can be fixed through the life of a storage drive. It is understood that this assignment of the memory devices 110 to the super devices 406 can be determined in a number of ways because there can be unpopulated instances of the memory devices 110 in the storage drive.

Although there are three of the super blocks 502 shown in FIG. 5, it is understood that there can be any number of the super blocks 502 in the storage control system 100 of FIG. 1. The super blocks 502 can be formed in each of the super devices 406. For example, since the super blocks 502 spans multiple of the memory channels 404, 8 pages within one of the super blocks 502 can be concurrently written.

A number of concurrent writes can be per logical unit (LUN) or dies. Each of the pages can be specifically on separate instances of the memory channels 404, or LUNs, and not just within one of the erase blocks 408.

Multiple of the erase blocks 408 grouped into each of the super blocks 502 by the block control module 306 provide several advantages. One of the advantages is that there fewer of the super blocks 502 than a number of the erase blocks 408 to manage and initialize by the block control module 306. Instead of managing lists of the erase blocks 408, lists of the super blocks 502 can be managed by the block control module 306. As a result, data management resources including management data structures for managing the super blocks 502 are smaller or less.

By creating the super blocks 502 that span multiple of the chip selects 112 of the memory devices 110, additional advantages are achieved. One advantage is that the super blocks 502 provide an infrastructure that supports an internal redundant array of independent disks (RAID) architecture including RAID-5. The super blocks 502 can be created in a way that facilitates efficient host performance, recycling, RAID, and load balancing performed by the memory access module 308.

The term "internal" used above for RAID refers to RAID within and specific to one of the super blocks 502. RAID parity information can be part of and limited to contents of the one of the super blocks 502. As such, operations to the one of the super blocks 502 self-contained with respect to providing RAID error protection to host data and any stored metadata information.

A number of the erase blocks 408 in each of the super blocks 502 can be determined by the super devices 406 of FIG. 4. For example, each of the super blocks 502 can include at least 16 of the erase blocks 408. Another advantage of the super blocks 502 is that the super blocks 502 can include a number of the erase blocks 408 that are bad or remapped. If one of the super blocks 502 includes a number of the erase blocks 408 that are bad blocks, the entirety of the one of the super blocks 502 would not be rendered as useless. The erase blocks 408 that are bad or unusable can be remapped by the block control module 306.

Within one of the super blocks 502, each of the erase blocks 408 does not have to be associated with the same erase block number (or address) in each of the elements. As an example, a portion of the 23rd instance of the super blocks 502 can include a number of the erase blocks 408 as follows.

Channel 0, CE0, LUN0, erase block 23
Channel 1, CE0, LUN0, erase block 23
Channel 2, CE0, LUN0, erase block 25
Channel 3, CE0, LUN0, erase block 23
Channel 4, CE0, LUN0, erase block 27

In this example, "Channel" is a corresponding channel number of the memory channels 404, "CE0" is chip enable 0, "LUN0" is logical unit 0, and "erase block" is an nth instance of the erase blocks 408.

Holes in contiguous addressing of erase blocks will exist from both factory marked bad erase blocks and erase blocks that have been determined to be bad during normal operation of the storage device. Remapped specifically refers to the substitution of one physical erase block for another.

Implementation of RAID-5 presents significant problems for recycling because parity pages need to be recycled along with data pages. By implementing RAID within the super blocks 502, data and parity pages are recycling together by the memory access module 308.

The super blocks 502 also provide a way for a recycling operation performed by the memory access module 308 to traverse data in the order by which that data is written. This operation minimizes the number of writes to the logical-to-physical log. This operation minimizes the number of writes to the logical-to-physical log, especially when the host system 108 writes larger data blocks.

Other advantages include fewer statistics, which can be included in the metadata pages 508, need to be managed by the block control module 306. These statistics can include a program-erase count 510 and a valid-page count 512. There can be fewer of the metadata pages 508.

The program-erase count 510 is defined as a numerical value indicating a number of times or cycles the memory devices 110 associated with the corresponding instances of the super blocks 502 are programmed or erased by the memory access module 308. The valid-page count 512 is defined as a numerical value indicating a number of pages that are valid in each of the super blocks 502.

Since host data can be written in the order it arrives from the host and because all data pages within the memory devices 110 can be written sequentially and contiguously, one or more new version of the same host logical sector can exist within the super blocks 502. In this case, only one of the host sectors can be valid, making other copies in the super blocks 502 invalid. The valid state of the pages within one of the super blocks 502 can be held in both the metadata pages 508 stored within the super blocks 502 and in the logical-to-physical (L2P) tabling system within the runtime volatile memory in the storage device.

Each of the super blocks 502 can include one of the metadata pages 508, denoted as Page-63. Each of the metadata pages 508 can span multiple physical pages and is not limited to a single physical page depending on a number of elements in each of the super blocks 502 and the amount of metadata required for each element. Each of the super blocks 502 can include only one of the metadata pages 508. The metadata pages 508 can include logical page indexes of the super blocks 502. If the size of the super blocks 502 is properly determined, each of the metadata pages 508 can have a size that matches a size of a physical page in the memory devices 110.

The metadata pages 508 can include any additional information stored along with host data that can aid in retrieval, organization, health of, and current condition or state of the memory devices 110. The metadata pages 508 can include but is not limited to a logical to physical mapping information of the host data within the memory devices 110. The metadata pages 508 that are held within one of the super blocks 502 can represent metadata specific to the one of the super blocks 502.

During portions of drive operations such as but not limited to drive initialization, the metadata pages 508 can be used to restore a host logical to physical mapping of data and a valid state of data stored within the one of the super blocks 502. The metadata pages 508 can also be used for storing the health and use status of the super blocks 502. The metadata pages 508 can be used to record the current recycling or runtime state of the super blocks 502.

For illustration purposes, the metadata pages 508 are labeled by "page-63" to indicate that the metadata pages 508 are stored in page 63 of one of the erase blocks 408 having 64 pages, although it is understood that the metadata pages 508 can be stored in the last page or any of the pages in the erase blocks 408. This allowed the firmware to know a priori where the metadata was held and could be accessed. In this example, this can allow firmware to be constructed to always search in a predetermined location for metadata.

Recycling operations performed by the memory access module 308 can traverse or access data by following the same order by which host-write operations follow. As such, the original striping can be preserved. A number of operations for writing to the L2P log can be minimized.

The super-block organization is conducive to implementing RAID 5 within the storage drive. The last instance of the erase blocks 408 in each of the super blocks 502 can include parity pages. For example, parity can be generated using exclusive-OR operations (XOR). The memory controller 104 can include support for initializing, building, and writing the parity pages.

Factory and run-time defects can be handled by the memory access module 308. If one of the erase blocks 408 within one of the super blocks 502 is bad, the entirety of the one of the super blocks 502 can optionally be thrown away. In addition, bad instances of the erase blocks 408 in the one of the super blocks 502 can be skipped or ignored by the memory access module 308. For example, the memory access module 308 can be implemented with the software 212 of FIG. 2 to process the super blocks 502 with missing or bad instances of the erase blocks 408.

Statistics for the erase blocks 408 can be used by the block control module 306 to estimate remaining lifetime of the storage drive or to extend the life of the storage drive if the super blocks 502 are provided with erase-block granularity. Depending on how the memory devices 110 are populated in the storage drive with reduced capacity, the chip selects 112 of the memory devices 110 that are not used can be processed by the block control module 306.

Each of the super blocks 502 can include the program-erase count 510. The program-erase count 510 and the valid-page count 512 can be managed at a super-block level by the block control module 306. The program-erase count 510 can be calculated by the block control module 306 each time the memory devices 110 are accessed for a program operation or an erase operation by the memory access module 308. The program-erase count 510 can be used by the block control module 306 to determine if wear begins to deteriorate the integrity of the memory devices 110.

The super blocks 502 can include any number of unusable blocks 514, which are defined as blocks that are no longer available for access. If one of the erase blocks 408 is one of the unusable blocks 514, writing and recycling operations performed by the memory access module 308 on the corresponding instance of the super blocks 502 can skip over the one of the erase blocks 408.

The super blocks 502 can include remapped blocks for the unusable blocks 514. The erase blocks 408 can represent spare blocks 516, which are blocks that are available for use. If the memory devices 110 include the spare blocks 516, one of the erase blocks 408 that is one of the unusable blocks 514 can be remapped to one of the spare blocks 516 by the memory access module 308. Remapping is preferably not spanned over different instances of the memory devices 110.

There can be multiple levels of performance improvements having to do with both the super blocks 502 and the use of remapping of the erase blocks 408. The performance improvements from the use of the super blocks 502 can be from but not limited to the centralized storage of the metadata pages 508 in a single location instead of in each of the erase blocks 408 in the super blocks 502. Each access to one of the erase blocks 408 can incur a latency overhead of reading and writing. By only having to access one of the erase blocks 408 in the super blocks 502, there can be an effective elimination of multiple erase block accesses to retrieve the same amount of information. For host data reading and writing, the remapping function can allow each of the super blocks 502 to have a full compliment of the erase blocks 408. All of the erase blocks 408 within one of the super devices 406 can be accessed in a parallel approach with the one of the super devices 406 active.

It has been discovered that the super blocks 502 spanning multiple of the memory channels 404 provide improved performance since multiple pages within each of the super blocks 502 are capable of being written concurrently by the memory access module 308.

It has also been discovered that multiple of the erase blocks 408 grouped into each of the super blocks 502 by the block control module 306 provide improved performance with reduced data management resources since there are fewer of the super blocks 502 than a number of the erase blocks 408 to manage and initialize by the block control module 306.

It has further been discovered that the super blocks 502 spanning multiple of the chip selects 112 of the memory devices 110 provide improved reliability with an infrastructure that supports an internal redundant array of independent disks (RAID) architecture including RAID-5.

It has further been discovered that the super blocks 502 including a number of the erase blocks 408 that are bad or remapped provides improved memory resource utilization since the super blocks 502 with the unusable blocks 514 do not have to be thrown away but instead the unusable blocks 514 are able to be remapped with the spare blocks 516 by the memory access module 308 thereby eliminating the shortcoming of traditional super blocks where a bad block renders the entire super block useless.

It has further been discovered that the super blocks 502 provide improved performance since there are fewer statistics, including the program-erase count 510 and the valid-page count 512, included in the metadata pages 508 that need to be managed by the block control module 306.

It has further been discovered that remapping of the unusable blocks 514 performed by the memory access module 308 provide improved performance since the super blocks 502 that are incomplete cause write performance degradation.

Figure 6:
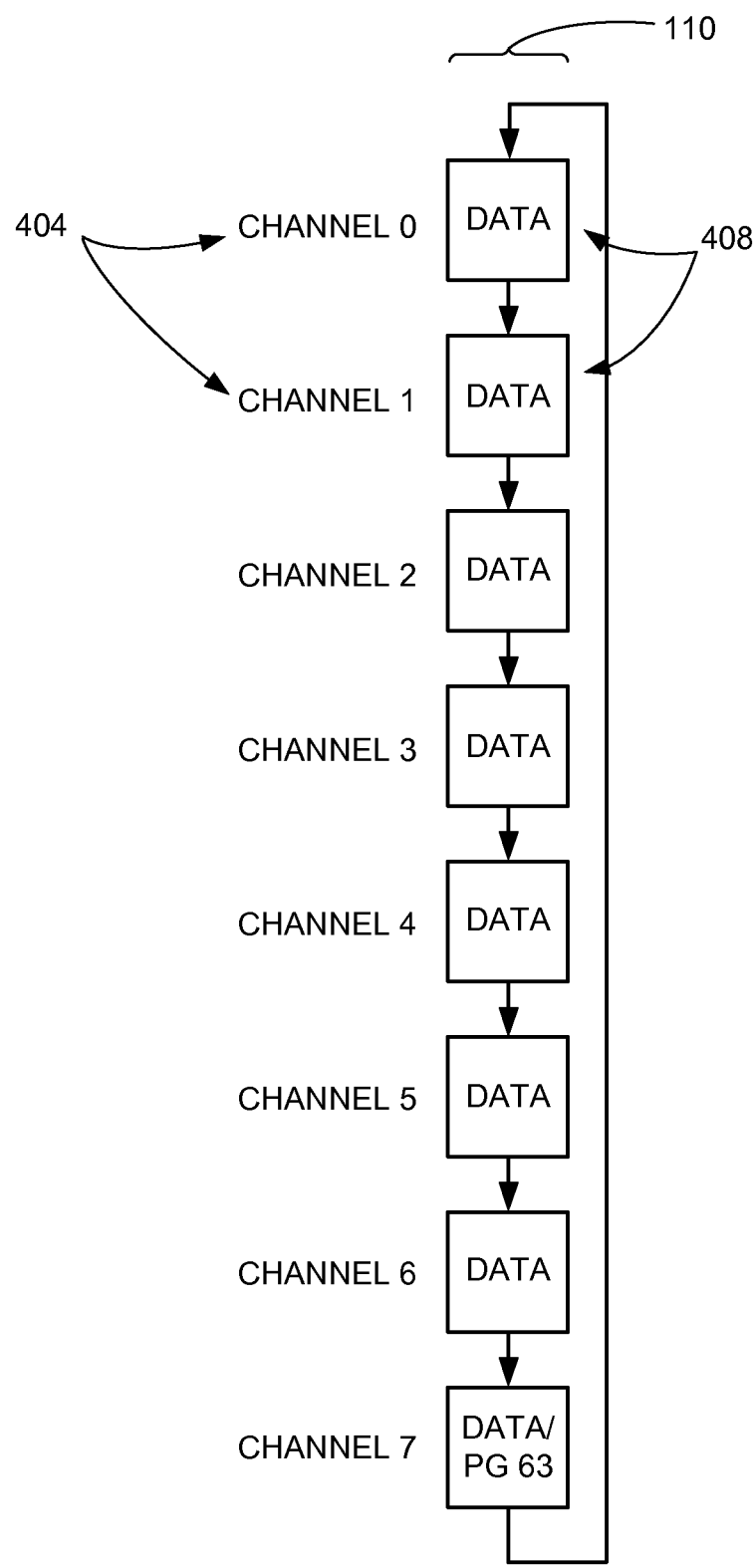
FIG. 6 is a flow diagram of a write operation.

Referring now to FIG. 6, therein is shown a flow diagram of a write operation. The flow diagram depicts function of the write operation performed by the memory access module 308 of FIG. 3 to control data flow through the memory groups 402 of FIG. 4 of the memory devices 110. The flow diagram also depicts how the erase blocks 408 for the write operation can be traversed or accessed. The write operation is described as follows for host write data from the host system 108 of FIG. 1 to the memory array 106 of FIG. 1 with the write operation performed by the memory access module 308.

The super blocks 502 of FIG. 5 can represent a virtual erase block. Similar to physical erase blocks (not shown) of the memory devices 110, the super blocks 502 as a virtual erase block can be written in sequential order by the memory access module 308. Because data pages are in different instances of the memory channels 404 and physically different instances of the erase blocks 408, this virtual erase block can be ordered such that multiple of the data pages can be written at the same time by the memory access module 308.

For example, the super blocks 502 can represent a 1024-page erase block. In this example, there is one of the metadata pages 508 of FIG. 5 and 1023 data pages of 8K size in bytes. If all the spare blocks 516 of FIG. 5 are used, sizes of the super blocks 502 can be smaller in this example because there are irreplaceable bad blocks.

For example, "8K" mentioned above refers to a number of user bytes in a NAND flash page. In the memory devices 110, pages can include a power of 2 bytes of user data and additional bytes for use by ECC and the metadata pages 508. "8K" refers to 8192 bytes. A page can include 8192+640 bytes of storage, in which case 8K bytes (8192) can be used for host data and 640 extra bytes can be used for but not limited to storing logical block address (LBA) information, ECC parity bytes, and NAND health information. The grouping of data pages in a given size can allow software tabling to be regularly organized. The term "regularly" refers to in this case consistent in size.

The super blocks 502 can be used to implement RAID-5 architectures within the storage drive. The parity pages can be stored by the memory access module 308 in the last instance of the erase blocks 408 within each of the super blocks 502. All the parity pages would be included in the same instance of the erase blocks 408.

For example, data can be stored by the memory access module 308 in the first six instances of the memory channels 404 in one of the super blocks 502. In this example, either data or optionally one of the metadata pages 508 can be stored by the memory access module 308 in the seventh instance of the memory channels 404 and a parity page can be stored by the memory access module 308 in the eighth or last instance of the memory channels 404.

Since the instance of the erase blocks 408 can be used or read only if there are uncorrectable error correction code (ECC) errors, the instance of the erase blocks 408 would not experience read disturbs. By having parity stored along with the super blocks 502, the erase blocks 408 with the parity can be erased along with the rest of the super blocks 502 during a recycling process performed by the memory access module 308.

When RAID architecture is used by the memory access module 308 for protection against a die or device, page, or erase block failure, a RAID stripe operation can be performed such that a parity page is not stored in the same instance of the memory devices 110 that are used to store data pages. After performing iteration through the super blocks 502, the parity page can be written by the memory access module 308. As a result, a RAID buffer can be used to maintain the current parity page by the memory access module 308 for each instance of the super blocks 502 that is open.

The super blocks 502 that are open are blocks that are still under construction. In other words, the super blocks 502 are still being added to or being filled with user data or the metadata pages 508 have not been written. Any time there are unwritten pages in any of the erase blocks 408 that make up one of the super blocks 502, the one of the super blocks 502 is considered open. In other words, open also refers to not completely logically written. The super blocks 502 can be closed without writing all of the physical pages, but when the state of the super blocks 502 is set to "closed", no more writing is allowed to take place, even if there are gaps or un-written pages within the super blocks 502.

For example, the memory access module 308 can include 12 RAID buffers for building or generating parity pages. As a result, 12 different RAID stripes can be operated at any given time. When RAID is not implemented on a super block basis, larger sizes of the super blocks 502 and less space for the parity pages can be used by the memory access module 308.

Figure 7:
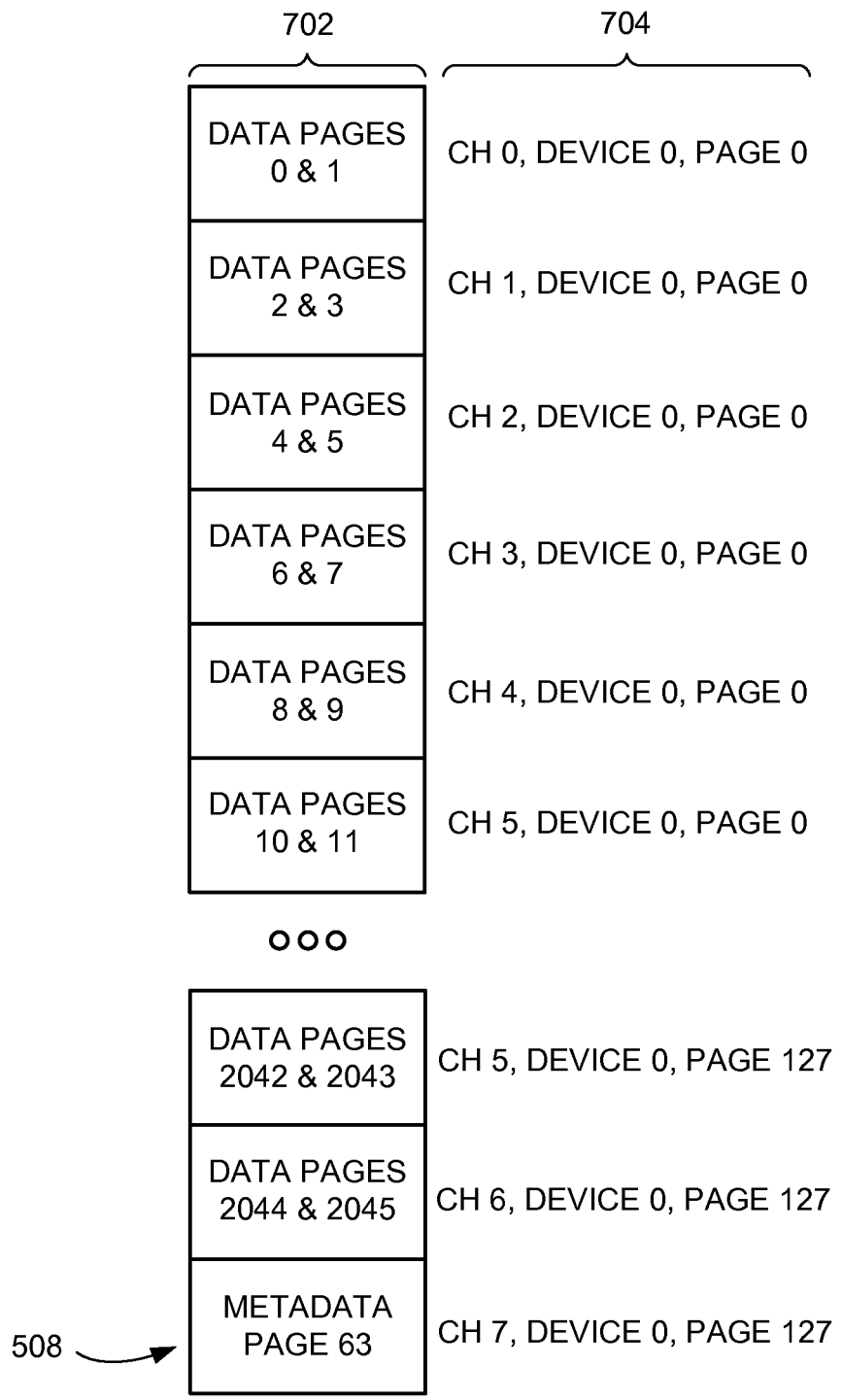
FIG. 7 is an example diagram of logical-to-physical page mapping.

Referring now to FIG. 7, therein is shown an example diagram of logical-to-physical page mapping. The example diagram depicts a mapping operation of logical pages 702 mapped to physical pages 704 in the memory devices 110 of FIG. 1. The mapping operation can be performed by the block control module 306 of FIG. 3. The logical pages 702 are defined as association or grouping of the physical pages 704 in the memory devices 110. The physical pages 704 are defined as pages in the memory devices 110.

The logical pages 702 are different from the physical pages 704. The logical pages 702 do not represent the physical arrangement of pages in the memory devices 110. On the other hand, the physical pages 704 represent the physical arrangement of pages in the memory devices 110. For example, the physical pages 704 can represent flash pages.

The example diagram depicts a first physical instance, denoted as "Device 0", of the memory devices 110. The first physical instance can include 128 of the physical pages 704, each of which spans across 8 of the memory channels 404 of FIG. 4, denoted as "Ch 0", "Ch 1"... "Ch 7".

As an example, 8K of the physical pages 704 in Device 0 can be mapped by the block control module 306 to two 4K of the logical pages 702, where 1K is equal to 1024. As another example, one of the metadata pages 508 can be mapped by the block control module 306 to one of the physical pages 704, denoted as "Ch 7, Device 0, Page 127".

Figure 8:
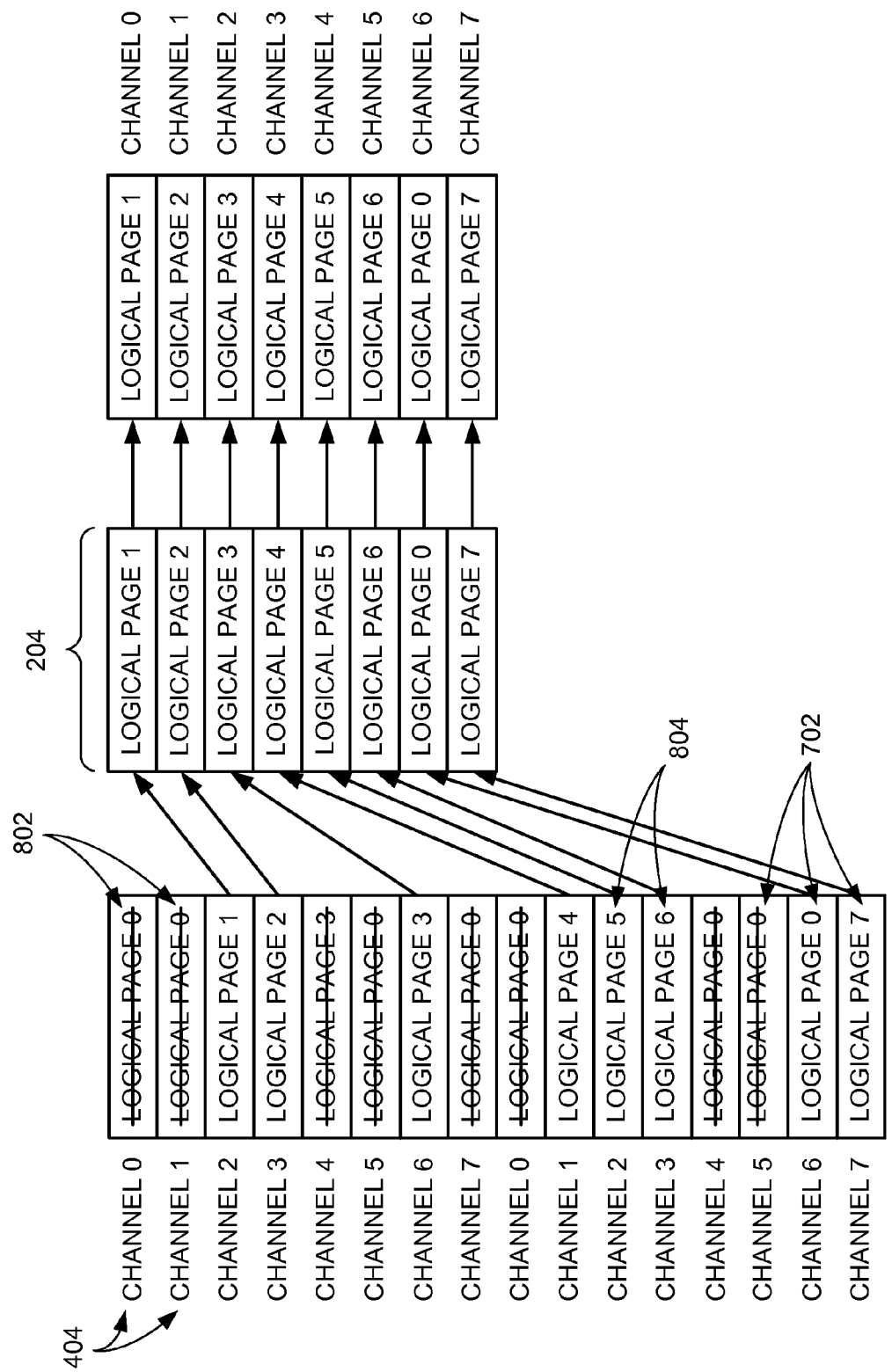
FIG. 8 is a functional block diagram of a recycle operation.

Referring now to FIG. 8, therein is shown a functional block diagram of a recycle operation. The functional block diagram depicts an operation of recycling data performed by the memory access module 308 of FIG. 3.

The memory access module 308 can include a flash translation layer (FTL), not shown, to recycle the super blocks 502 of FIG. 5 for different reasons. Some of these reasons can include freeing space and wear leveling. Regardless of the reason, the FTL can perform the same steps to recycle the super blocks 502.

When recycling one of the super blocks 502, it is understood that there is no performance advantage to keep the logical pages 702 in the same instance of the memory channels 404 because the logical pages 702 are to be copied into an external memory outside the memory channels 404 by the memory access module 308. As such, the functional block diagram depicts some of the logical pages 702, denoted with strikethroughs, which are not kept and therefore not written to the external memory by the memory access module 308.

The external memory can be implemented in the memory access module 308. The external memory can be implemented using the storage unit 204. For example, the storage unit 204 can include Double Data Rate Random Access Memory (DDR RAM or DDRAM) or Scratch Pad Memory (SPM) to implement the external memory.

By having the super chip selects 504 of FIG. 5 of the super blocks 502 spanning multiple of the chip selects 112 of FIG. 1, valid pages in the memory devices 110 controlled by the chip selects 112 can be rebalanced during the recycling operation performed by the memory access module 308. The valid pages are the last temporal copy of a given host logical page. Every time the host system 108 of FIG. 1 writes a logical sector or page, any previous copy of the logical sector or page that is held within persistent or non-persistent memory can be then considered not valid or an older copy. For example, the non-persistent memory can represent the memory devices 110.

There can be only one valid copy of the logical sector or page of host data. When a storage device or drive is formatted or freshly initialized, there would be no valid pages. Only after the storage device has been written to, are there valid pages. A special case is read accesses to a logical page not written can internally not have a valid page associated with them. In this special case, the storage device or drive can return a fixed uninitialized value to the host system 108. For example, a value of 0xFF in hexadecimal can be returned for an unwritten logical address space or a returned value can be set by special commands from the host system 108.

The functional block diagram depicts an example of first 16 of the logical pages 702 of one of the super blocks 502. The functional block diagram depicts how the recycle operation compact data by the memory access module 308. For clarity purposes, the metadata pages 508 of FIG. 5 are excluded in the functional block diagram for convenience of analyzing load balancing performed by the memory access module 308.

The functional block diagram depicts recycle pages 802 and write pages 804. The recycle pages 802 are a number of the logical pages 702 that are not saved to the external memory by the memory access module 308. The memory channels 404 that include the recycle pages 802, denoted with strikethroughs, are to be made available for writing data, for example, either during the recycle operation or in subsequent write operations performed by the memory access module 308.

The write pages 804 are a number of the logical pages 702 that are kept and thus to be saved to the external memory by the memory access module 308. Subsequently, the write pages 804 can be written or saved by the memory access module 308 to first 8 of the memory channels 404, some of which are made available by not keeping the recycle pages 802.

The recycle operation performed by the memory access module 308 can rebalance the data between the memory channels 404. For example, let one of the super blocks 502 spans across eight instances of the memory channels 404, denoted as Channel 0 to Channel 7. Also for example, let Channel 0, Channel 1, Channel 2, Channel 3, Channel 4, Channel 5, Channel 6, and Channel 7 include a number of the logical pages 702 that are determined valid by the memory access module 308 as 0, 1, 2, 2, 0, 0, 2, and 1, respectively. The recycle operation can rebalance the data between the memory channels 404 with Channel 0, Channel 1, Channel 2, Channel 3, Channel 4, Channel 5, Channel 6, and Channel 7 having a number of the logical pages 702 that are valid as 1, 1, 1, 1, 1, 1, 1, and 1, respectively.

Using the super blocks 502, the data that are written can be kept together, for example, in large single blocks during the write operation and after the recycle operation are completed by the memory access module 308. By using the super blocks 502, data pages can be moved by the memory access module 308 in the same order that the host system 108 writes the data pages. As such, the number of writes to the L2P log can be minimized when recycling large-block writes is performed by the memory access module 308.

As for the erase blocks 408 of FIG. 4, all the erase blocks 408 in each of the super blocks 502 can be erased at the same time by the memory access module 308. During an erasure operation of the entirety of the super blocks 502 at one time, the entirety of the super devices 406 of FIG. 4 associated with the super blocks 502 being erased is unavailable for reads.

The super blocks 502 can optionally be erased in smaller groups or even singularly to accommodate read operations requested by the host system 108 or conserve operation power. It is understood that the super devices 406 that are used in the erasure operation can be different from the super devices 406 that are used in the write operation requested by the host system 108. Therefore, the erasure or recycle operation does not affect host writes.

As an example, the memory devices 110 can represent 32-nanometer (nm) multi-level cell (MLC) flash memory devices. As another example, the memory devices 110 can include a multi-plane architecture.

For example, the memory devices 110 can be used to construct a 512-gigabyte (GB) drive. The memory devices 110 can include 4096 of the erase blocks 408 and additional blocks for the spare blocks 516 of FIG. 5. The memory devices 110 can include 128 of 8K pages per each of the erase blocks 408, where 1K is equal to 1024. As such, there can be 512K of the erase blocks 408, each having a size of 1-megabyte (MB), where 1 MB is equal to 2^20 bytes. The symbol "^" refers to "to the power of". With 4K of the logical pages 702, sizes of the super blocks 502 can be determined as follows.

As an example, a number of the erase blocks 408 per each of the super blocks 502, a number of the super devices 406, a number of the super blocks 502, and a size of one of the metadata pages 508 can be 4, 32, 128K, and 4 KB, respectively. As another example, a number of the erase blocks 408 per each of the super blocks 502, a number of the super devices 406, a number of the super blocks 502, and a size of one of the metadata pages 508 can be 8, 16, 64K, and 8 KB, respectively. As yet another example, a number of the erase blocks 408 per each of the super blocks 502, a number of the super devices 406, a number of the super blocks 502, and a size of one of the metadata pages 508 can be 16, 8, 32K, and 16 KB, respectively.

In the examples above, each of the super blocks 502 having eight of the erase blocks 408 can be selected by the block control module 306 of FIG. 3. However, it is understood that the software 212 of FIG. 2 can be implemented in the block control module 306 to support the super blocks 502 of any sizes.

Figure 9:
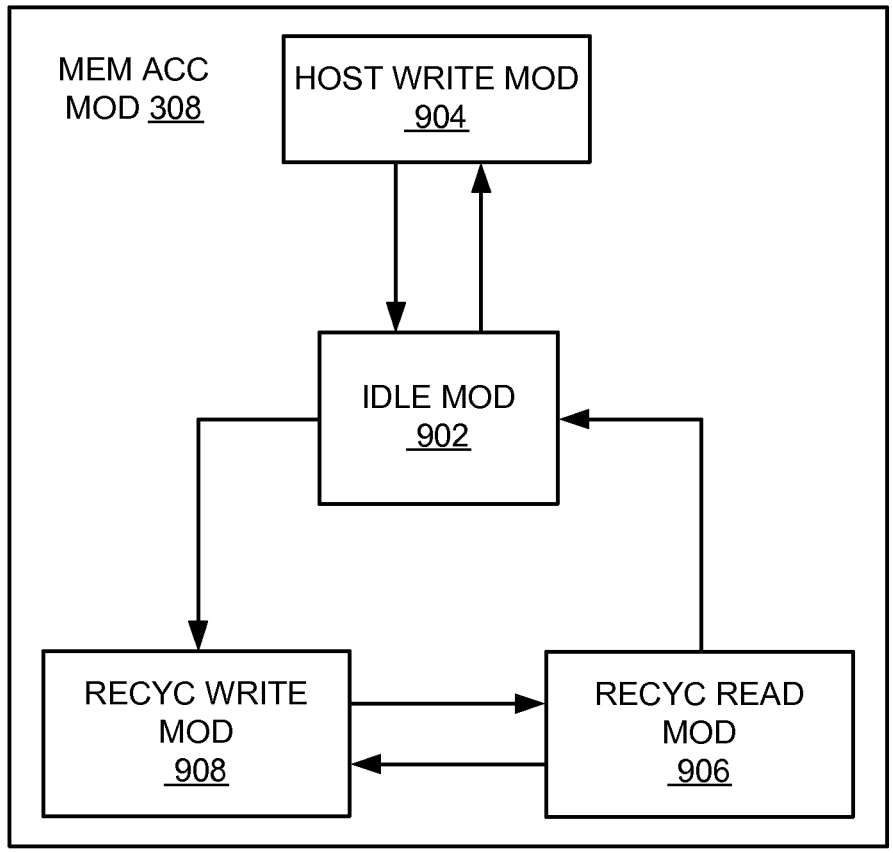
FIG. 9 is an example of a detailed control flow of the memory access module.

Referring now to FIG. 9, therein is shown an example of a detailed control flow of the memory access module 308. The detailed control flow represents a state diagram of operational states of a number of the super devices 406 of FIG. 4.

The memory access module 308 can include an idle module 902, a host-write module 904, a recycle-read module 906, and a recycle-write module 908. The idle module 902, the host-write module 904, the recycle-read module 906, or the recycle-write module 908 can be performed based on the operational states of the super devices 406. Regardless of the dimension of the super blocks 502 of FIG. 5, the memory access module 308 can control the super devices 406 using the idle module 902, the host-write module 904, the recycle-read module 906, or the recycle-write module 908.

The state diagram depicts an operation of the memory access module 308 either with or without recycling operations. When recycling is not enabled, the super devices 406 can be operated and controlled by the idle module 902 or the host-write module 904. When recycling is enabled, the super devices 406 can be operated and controlled by the idle module 902, the host-write module 904, the recycle-read module 906, or the recycle-write module 908.

When the super devices 406 are controlled by the idle module 902, the super devices 406 are in a healthy state. If recycling is enabled, the super devices 406 are the healthiest from the recycle operation. The super devices 406 can be subsequently used for host writes. The healthy state of the super devices 406 will be subsequently described in more details.

When the super devices 406 are controlled by the host-write module 904, the super devices 406 are servicing host writes requested from the host system 108 of FIG. 1 to the memory controller 104 of FIG. 1. A number of the super devices 406 can be in this state. When the health of one of the super devices 406 in this state becomes less than that of another of the super devices 406 controlled by the idle module 902, control of these two instances of the super devices 406 can be swapped by the memory access module 308. A swap operation can take place when the super devices 406 finish writing one of the metadata pages 508 of FIG. 5 for the super blocks 502.

When one of the super devices 406 is controlled by the recycle-read module 906, the one of the super devices 406 includes the super blocks 502 that are being recycled. Valid pages can be read out or the super blocks 502 can be erased by the recycle-read module 906. Each time a recycle operation performed for the super blocks 502 is completed, the memory access module 308 can determine if the super devices 406 are to be transitioned to a different state by transferring control to the appropriate module in the memory access module 308.

When one of the super devices 406 is controlled by the recycle-write module 908, the one of the super devices 406 is writing relocated valid pages from another of the super devices 406 that is controlled by the recycle-read module 906. Instances of the super devices 406 that are being written can be different from instances of the super devices 406 that are being read so that the next set of recycle pages can be read while the current set of pages are being written. As such, the super devices 406 can be rebalanced by the memory access module 308.

A recycle operation is a process of reclaiming the super blocks 502 that are older or written a longer time in the past. The super blocks 502 that are reclaimed can have only a portion of pages valid or the age of the super blocks 502 can require the data to be moved for retention reasons. In this process, one or more of the super blocks 502 can be identified to read valid pages from and rewrite them to a new open super block. During the recycle operation, valid pages can be read from a donor super block and written to a new open super block, and stale or invalid pages (pages where there is a new temporal copy) are not read from (or moved out of) the donor super block.

Partitioning the super devices 406 into the states described above by the memory access module 308 can avoid several conflicts. For example, a host-write operation performed by the host-write module 904 conflict with an erase operation performed either by the recycle-read module 906 or the recycle-write module 908 can be avoided because each of these operations is performed for different instances of the super devices 406. The memory access module 308 can optionally include a scheduler implementation in a case of conflict with host reads because the host reads can be associated with any of the erase blocks 408 of FIG. 4 at any time.

The idle module 902, the recycle-read module 906, and the recycle-write module 908 form a loop. The healthy state of each of the super devices 406 can be determined based on a number of the super blocks 502 that are ready-for-use. In other words, the higher the number of the super blocks 502 that are ready-for-use, the "healthier" the super devices 406 are.

The super devices 406 in this loop work together to create healthier super devices. At any given time, the super devices 406 controlled by the idle module 902 can represent the healthiest (or close to the healthiest) super devices in this recycle loop. As a result, the memory access module 308 can swap the super devices 406 controlled by the host-write module 904 with the super devices 406 controlled by the idle module 902.

If state transitions negatively affect performance, hysteresis can be used so that the super devices 406 can stay in each state a little longer. The state transitions can negatively affect the performance because an increase of a number of state transitions cause an increase in execution time of an operation and thus decreasing an overall system throughput. For example, hysteresis can be provided by increasing a threshold numerical value for comparing an output of a function of state input parameters resulting in a number of the state transitions would decrease thereby improving the performance.

As for remapping bad blocks, a number of the erase blocks 408 that are available in a die or LUN can be allocated so that they can be used in place of factory or run-time defects. For example, 56 of the erase blocks 408 can be saved and be used to replace defective blocks.

For example, since there can be over 56 bad blocks over the lifetime of the memory devices 110 of FIG. 1, the super blocks 502 that are incomplete can be processed by the memory access module 308. The remapping operation can be performed to cover factory defects and any infant mortality. Incomplete refers to the super blocks 502 that are currently not assigned a full complement of the erase blocks 408. In other words, the super blocks 502 can represent partially utilized super blocks.

Remapping bad blocks can optionally be performed by the memory access module 308 to provide an advantage of increased performance since an incomplete super block decreases write performance. When bad blocks are remapped, the memory access module 308 can interface with the block control module 306 of FIG. 3.

The block control module 306 can be used to determine which of the erase blocks 408 can be used to replace the bad blocks. The erase blocks 408 used for replacing the bad blocks can include those that make up or are included in the super blocks 502. Such instances of the erase blocks 408 can include the erase blocks 408 that are previously remapped.

The block control module 306 can also determine instances of the super blocks 502 to which the erase blocks 408 belong. This operation is performed when super-block statistics, including the valid-page count 512 of FIG. 5, is updated by the block control module 306. For example, if a page in one of the erase blocks 408 that is remapped is obsolete, the L2P log can return the previous address in terms of the physical erase block. The valid-page count 512 in the corresponding instance of the super blocks 502 can be updated by the block control module 306.

A mapping operation of the bad blocks can be captured in a persistent manner, for example, using a serial data link protocol including a Serial Peripheral Interface (SPI) or any other synchronous serial data link protocol by the memory access module 308. Persistent manner refers to storage of information across power cycles. Configuration information and operational firmware can be stored in an SPI device, which can represent a NOT-OR (NOR) type non-volatile memory or a non-volatile low power flash memory device. The SPI device can be separate from the memory devices 110 that are used for storing host data. The SPI device can be seldom written and can have extremely long persistence, which is good for but not limited to storing the configuration information and the operational firmware.

The mapping data structures can be rebuilt during initialization by the memory access module 308. In order for the remapping operation to be beneficial, the cost of using the mapping data structures is less than the theoretical increased performance.

Functions or operations of the memory controller 104 as described above can be implemented with the control unit 202 of FIG. 2, the storage unit 204 of FIG. 2, the memory interface unit 206 of FIG. 2, the host interface unit 208 of FIG. 2, or a combination thereof. For example, the channel control module 302 of FIG. 3 can be implemented with the control unit 202 to partition the memory channels 404 of FIG. 4 with the memory devices 110. Also for example, the device control module 304 of FIG. 3 can be implemented with the control unit 202 to select the super devices 406 with one of the memory devices 110 from one of the memory channels 404.

As an example, the block control module 306 can be implemented with the control unit 202 to select the super blocks 502 associated with only one instance of the super devices 406 or the super chip selects 504 of FIG. 5. As another example, the block control module 306 can be implemented with the control unit 202 to write the super blocks 502 with the parity information 506 of FIG. 5 in the erase blocks 408 at the end of the super blocks 502.

As an example, the block control module 306 can be implemented with the control unit 202 to select the super blocks 502 having the program-erase count 510 of FIG. 5, the valid-page count 512, the spare blocks 516 of FIG. 5, and the metadata pages 508. As another example, the block control module 306 can be implemented with the control unit 202 to select the super blocks 502 having the unusable blocks 514 of FIG. 5 and remap the unusable blocks 514 with the spare blocks 516.

For example, the idle module 902 can be implemented with the control unit 202 to operate and control the super devices 406. Also for example, the host-write module 904 can be implemented with the control unit 202 to operate and control the super devices 406. Further for example, the recycle-read module 906 can be implemented with the control unit 202 to control the super devices 406, erase the super blocks 502. Yet further for example, the recycle-write module 908 can be implemented with the control unit 202 to control the super devices 406 and write the relocated valid pages from the another of the super devices 406 that is controlled by the recycle-read module 906.

Figure 10:
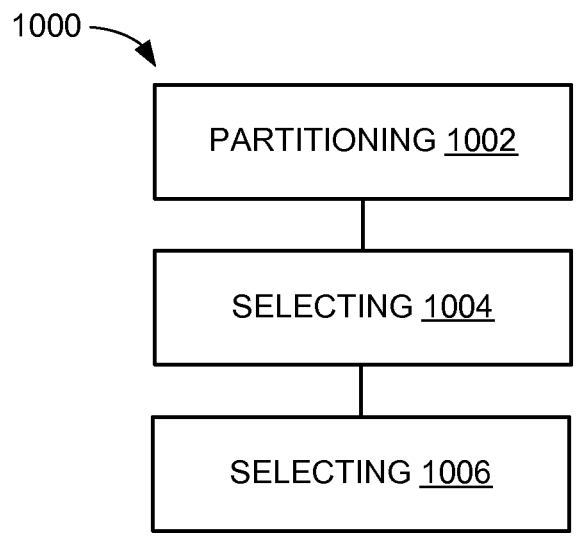
FIG. 10 is a flow chart of a method of operation of the storage control system of FIG. 1 in a further embodiment of the present invention.

Referring now to FIG. 10, therein is shown a flow chart of a method 1000 of operation of the storage control system 100 of FIG. 1 in a further embodiment of the present invention. The method 1000 includes: partitioning memory channels with memory devices in a block 1002; selecting a super device with one of the memory devices from one of the memory channels, the super device having a super chip select connected to chip selects of the memory devices in a block 1004; and selecting a super block associated with the super device in a block 1006.

Thus, it has been discovered that the storage control system 100 of the present invention furnishes important and heretofore unknown and unavailable solutions, capabilities, and functional aspects for a storage control system with data management mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage system comprising a plurality of memory devices partitioned into a plurality of memory groups, the method comprising:
    selecting a super block corresponding to a super device;
        wherein the super block comprises a plurality of blocks from a first subset of the plurality of memory devices, the first subset including at least one memory device from each of two or more of the memory groups; and
        wherein the super device comprises a plurality of super blocks including the super block;
    performing an operation on the super block; and
    updating metadata corresponding to the super block;
        wherein the metadata is stored in one or more blocks within the super block, the one or more blocks designated for storing non-host information; and
        wherein the metadata includes a program-erase count indicative of the number of times the super block has been programmed and erased.

2. The method as claimed in claim 1 wherein the performed operation is a program operation or an erase operation.

3. The method as claimed in claim 1 wherein selecting the super block includes utilizing a super chip select corresponding the super block to select the super block, wherein the super chip select controls a chip select of each memory device in the first subset of the plurality of memory devices.

4. The method as claimed in claim 1 wherein the super block includes one or more spare blocks.

5. The method as claimed in claim 4 further comprising:
    in accordance with a determination that the super block contains a bad block, remapping the super block, the remapping comprising:
        designating the bad block as an unusable block; and
        designating a spare block of the one or more spare blocks as a usable block; and
    updating the metadata corresponding to the super block, wherein updating the metadata includes updating a mapping of the super block and updating a valid page count for the super block.

6. The method as claimed in claim 1 wherein the operation is a program operation and the method further comprises writing parity information within the super block, the parity information corresponding to the program operation.

7. The method as claimed in claim 1
    wherein the metadata includes information corresponding to host data stored within the super block.

8. The method as claimed in claim 1 wherein the plurality of super blocks include the super block and a second super block, the second super block comprising a second plurality of blocks;
    wherein the plurality of blocks comprising the first super block correspond to a first plane; and
    wherein the second plurality of blocks correspond to a second plane, distinct from the first plane.

9. The method as claimed in claim 1 wherein the storage system comprises a plurality of super devices, including the super device; and
    the method further comprises:
        designating a first subset of the plurality of super devices as available for host operations, the first subset including the super device;
        designating a second subset of the plurality of super devices as requiring recycling; and
        designating a third subset of the plurality of super devices as available for receiving data from super devices being recycled.

10. The method as claimed in claim 9 wherein designating the first subset of the plurality of super devices as available for host operations includes designating the first subset based in part on health information corresponding to the first subset of super devices.

11. A storage system comprising:
    a plurality of memory devices partitioned into a plurality of memory groups; and
    a storage controller coupled to the plurality of memory devices, the storage controller configured to:
        select a super block corresponding to a super device;
            wherein the super block comprises a plurality of blocks from a first subset of the plurality of memory devices, the first subset including at least one memory device from each of two or more of the memory groups; and
            wherein the super device comprises a plurality of super blocks including the super block;
        perform an operation on the super block; and
        update metadata corresponding to the super block;

wherein the metadata is stored in one or more blocks within the super block, the one or more blocks designated for storing non-host information; and wherein the metadata includes a program-erase count indicative of the number of times the super block has been programmed and erased.

12. The system as claimed in claim 11 wherein the performed operation is a program operation or an erase operation.

13. The system as claimed in claim 11 wherein selecting the super block includes utilizing a super chip select corresponding the super block to select the super block, wherein the super chip select controls a chip select of each memory device in the first subset of the plurality of memory devices.

14. The system as claimed in claim 11 wherein the super block includes one or more spare blocks.

15. The system as claimed in claim 11 the storage controller further configured to:
  in accordance with a determination that the super block contains a bad block, remap the super block, the remapping comprising:
    designating the bad block as an unusable block; and
    designating a spare block of the one or more spare blocks as a usable block; and
  update the metadata corresponding to the super block, wherein updating the metadata includes updating a mapping of the super block and updating a valid page count for the super block.

16. The system as claimed in claim 11 wherein the operation is a program operation and the storage controller is further configured to write parity information within the super block, the parity information corresponding to the program operation.

17. The system as claimed in claim 11
  wherein the metadata includes information corresponding to host data stored within the super block.

18. The system as claimed in claim 11 wherein the plurality of super blocks include the super block and a second super block, the second super block comprising a second plurality of blocks;
  wherein the plurality of blocks comprising the first super block correspond to a first plane; and
  wherein the second plurality of blocks correspond to a second plane, distinct from the first plane.

19. The system as claimed in claim 11 wherein the storage system comprises a plurality of super devices, including the super device; and
  the storage controller is further configured to:
    designate a first subset of the plurality of super devices as available for host operations, the first subset including the super device;
    designate a second subset of the plurality of super devices as requiring recycling; and
    designate a third subset of the plurality of super devices as available for receiving data from super devices being recycled.

20. The system as claimed in claim 19 wherein designating the first subset of the plurality of super devices as available for host operations includes designating the first subset based in part on health information corresponding to the first subset of super devices.

* * * * *